(12) United States Patent
Hori

(10) Patent No.: US 6,338,580 B2
(45) Date of Patent: Jan. 15, 2002

(54) FILM SUPPORT AND FEED SYSTEM OF A CAMERA

(75) Inventor: Masakatsu Hori, Saitama (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/740,958

(22) Filed: Dec. 21, 2000

(30) Foreign Application Priority Data

Dec. 24, 1999 (JP) .......................................... 11-366564P

(51) Int. Cl.⁷ ............................. G03B 1/00; G03B 17/00
(52) U.S. Cl. ........................ 396/418; 396/441; 396/442; 355/73
(58) Field of Search .......................... 209/905; 396/418, 396/440, 442, 413, 411, 437, 439, 441; 271/5; 355/73; 415/910

(56) References Cited

U.S. PATENT DOCUMENTS 5,075,704 A * 12/1991 Yamamoto et al. ......... 396/441
5,207,413 A * 5/1993 Maron ........................... 271/5
6,035,147 A    3/2000 Kurosawa
6,157,785 A   12/2000 Kawano et al.

FOREIGN PATENT DOCUMENTS

JP   5419863   *  7/1979  ........... G03B/17/28

* cited by examiner

Primary Examiner—David M. Gray
(74) Attorney, Agent, or Firm—Greenblum & Bernstein P.L.C.

(57) ABSTRACT

A film support and feed system of a camera includes a pressure plate, a film feed mechanism which moves the film frame in a space in front of the pressure plate, a film suction mechanism which brings the film frame into intimate contact with the pressure plate by vacuum aspiration, a reversible motor, and an associating mechanism which selectively associates the reversible motor with either the film feed mechanism or the film suction mechanism in accordance with a direction of rotation of the reversible motor. The reversible motor is associated with the film feed mechanism by the associating mechanism to operate the film feed mechanism when the reversible motor is driven to rotate in a forward direction, or to operate the film suction mechanism when the reversible motor is driven to rotate in a reverse direction.

10 Claims, 3 Drawing Sheets

FILM SUPPORT AND FEED SYSTEM OF A CAMERA

BACKGROUND OF THE INVENTION

1. Field of the Invention

The present invention relates to a system which supports and feeds roll-film in a camera.

2. Description of the Related Art

In photography using light-sensitive film such as 35 mm roll-film or 120 roll-film, a film frame of the roll-film which lies on the pressure plate of the camera (i.e., in the rectangular picture format area of the camera) must be held flat during the exposure of the film frame. However, due to a curling effect of the film, it is sometimes the case that the film frame on the pressure plate cannot be held flat precisely if the film frame is simply fed to lie on the pressure plate. To prevent this problem from occurring, there has been developed a vacuum mechanism which brings the film frame into intimate contact with the pressure plate by vacuum aspiration. Such a conventional vacuum mechanism is provided with a coil as a drive source so that an air suction pump is actuated by electromagnetic force generated by the coil to bring the film frame into intimate contact with the pressure plate by vacuum aspiration. However, according to such a conventional vacuum mechanism, it is necessary to provide a camera with such an independent drive source so as to suck the film frame on the pressure plate, which is disadvantageous in the efficiency of space in the camera and also the cost of production. Furthermore, in such a conventional vacuum mechanism, the duration of film suction is generally short, so that the conventional vacuum mechanism is not suitable for bulb exposure.

SUMMARY OF THE INVENTION

The present invention has been devised in view of the aforementioned problems that reside in the conventional vacuum mechanism. An object of the present invention is to provide a film support and feed system of a camera which does not require an independent drive source for bringing the film frame which lies on the pressure plate into intimate contact with the pressure plate by vacuum aspiration, and which makes a long-duration film suction possible with excellent space efficiency and at a low cost of production.

To achieve the object mentioned above, according to an aspect of the present invention, a film support and feed system of a camera is provided, including a pressure plate positioned immediately behind a frame of roll-film which is to be exposed at a shutter release, a film feed mechanism which moves the film frame in a space in front of the pressure plate, a film suction mechanism which brings the film frame into intimate contact with the pressure plate by vacuum aspiration, a reversible motor, and an associating mechanism which selectively associates the reversible motor with either the film feed mechanism or the film suction mechanism in accordance with a direction of rotation of the reversible motor. The reversible motor is associated with the film feed mechanism by the associating mechanism to operate the film feed mechanism when the reversible motor is driven to rotate in a forward direction, and the reversible motor is associated with the film suction mechanism by the association mechanism to operate the film suction mechanism when the reversible motor is driven to rotate in a reverse direction.

With this film support and feed system, the reversible motor used to drive the film feed mechanism is also used to drive the film suction mechanism. Therefore it is unnecessary to provide two independent drive sources (motors) for the film feed mechanism and the film suction mechanism, which is advantageous for space efficiency in the camera, and also lowers the cost of production. Furthermore, since the film suction operation continues as long as the reversible motor is driven to rotate in the reverse direction, the camera body with the film back can be advantageously used for bulb exposure.

Preferably, a controller is also included, which controls the reversible motor to continue rotating in the reverse direction to thereby keep the film frame into intimate contact with the pressure plate by vacuum aspiration by the film suction mechanism during an exposure of the film frame.

Preferably, the associating mechanism includes a planet gear which is engaged with a gear of either the film feed mechanism or the film suction mechanism when the reversible motor is driven to rotate in the forward direction or the reverse direction, respectively.

Preferably, the camera includes a camera body and a film back which is detachably attached to the camera body, wherein at least the pressure plate, the film feed mechanism and the film suction mechanism are incorporated in the film back.

In an embodiment, a film winding operation in which the roll-film is wound on a take-up spool of the camera is performed when the reversible motor is driven to rotate in the forward direction.

Preferably, the film suction mechanism includes a plurality of through holes formed on pressure plate, and a suction pump having a rotor; wherein the suction pump is associated with the reversible motor to rotate the rotor when the reversible motor is driven to rotate in the reverse direction.

In an embodiment, the space, in which the film frame is moved by the film feed mechanism, is positioned behind an aperture formed on the camera body which forms the limits of each film frame exposed of the roll-film.

Preferably, the associating mechanism includes a planetary gear which includes of a sun gear and a planet gear which is engaged with and rotates around the sun gear.

According to another aspect of the present invention, a camera system having a camera body and a film back which is detachably attached to the camera body is provided, the camera body including a reversible motor, wherein roll-film is accommodated in the film back. The film back includes a pressure plate positioned immediately behind a film frame of the roll-film which is to be exposed at a shutter release, a film feed mechanism which feeds the film frame, a film suction mechanism which brings the film frame into intimate contact with the pressure plate by vacuum aspiration, and an associating mechanism which selectively associates the reversible motor with one of the film feed mechanism and the film suction mechanism in accordance with a direction of rotation of the reversible motor. The reversible motor is associated with the film feed mechanism by the associating mechanism to operate the film feed mechanism when the reversible motor is driven to rotate in a forward direction. The reversible motor is associated with the film suction mechanism by the association mechanism to operate the film suction mechanism when the reversible motor is driven to rotate in a reverse direction.

According to another aspect of the present invention, a film support and feed system of a camera is provided, including a film feed mechanism which moves a-roll film in a space in front of a pressure plate, a film suction mechanism which brings the film into intimate contact with the pressure plate by vacuum aspiration, a reversible motor, and an associating mechanism which selectively associates the reversible motor with the film feed mechanism or the film suction mechanism in accordance with a forward rotation or reverse rotation of the reversible motor.

The present disclosure relates to subject matter contained in Japanese Patent Application No. 11-366564 (filed on Dec. 24, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
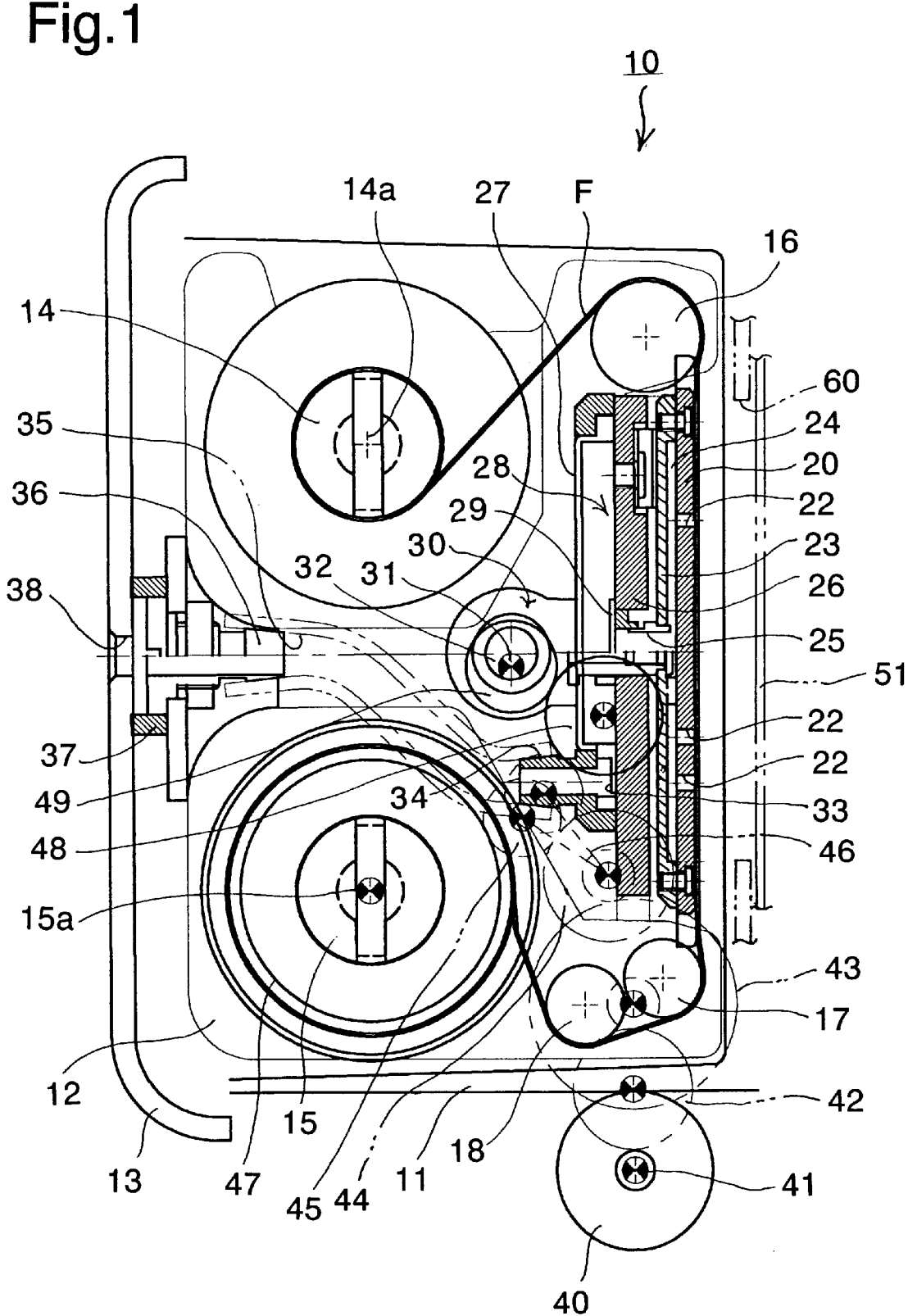
FIG. 1 is a side elevational view, partly in cross section, of a film back which incorporates a film support and feed system to which the present invention is applied.

A film support and feed system according to the present invention which is incorporated in a camera system including a film back will be described below in detail with reference to FIGS. 1 through 3. Note that the front and rear sides of the camera system correspond to the right and left sides of the drawing as viewed in FIG. 1, respectively.

Figure 2:
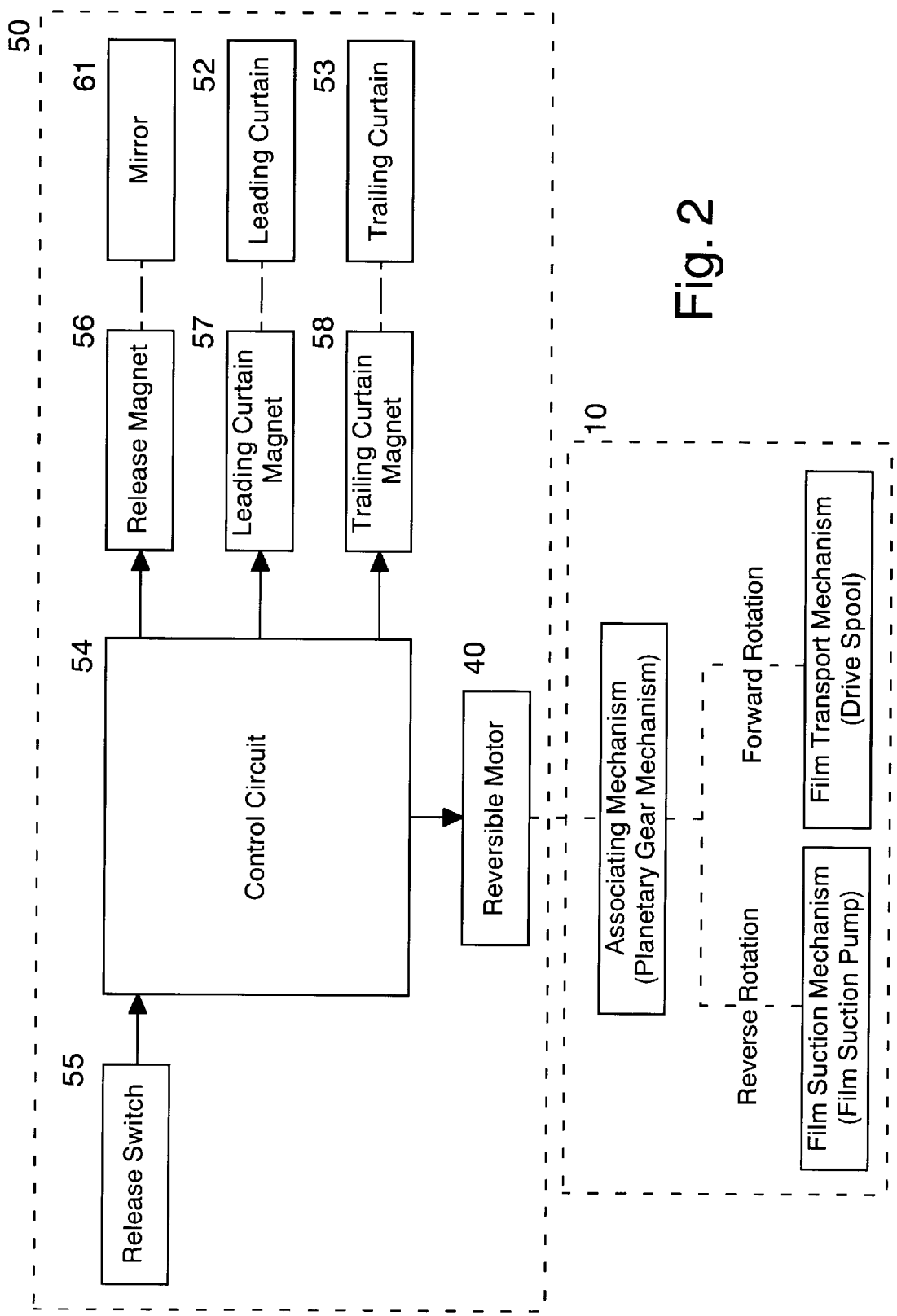
FIG. 2 is a schematic block diagram of the film back shown in FIG. 1 and a camera body to which the film back is attached, showing fundamental components of the film back and the camera body.
Figure 3:
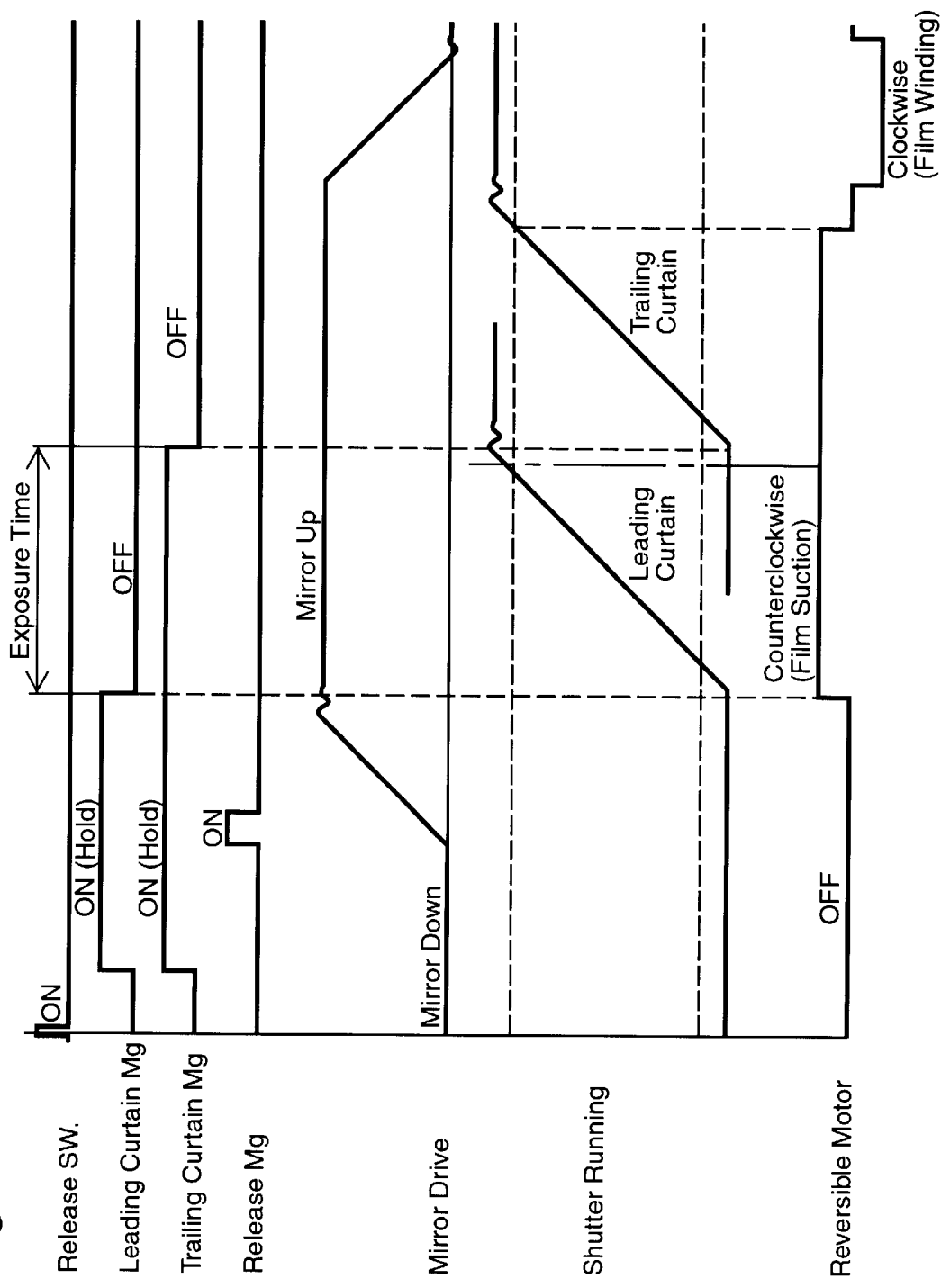
FIG. 3 is a time chart showing an example of a sequence of fundamental operations in an exposure process in the camera to which the film back shown in FIG. 1 is attached.

Film back 10 shown in FIG. 1 is detachably attached to the back of a camera body 50 (see FIG. 2). The film back 10 is provided with a film back body 11, an inner frame 12 positioned in the film back body 11, and a back lid 13. In a state where the film back 10 is attached to the camera body 50, the film back 10 except for the back lid 13 is positioned entirely in a light-tight chamber formed within the camera body 50, while the back lid 13 tightly closes the back of the camera body 50 so as to close the light-tight chamber.

The film back 10 is provided therein with two parallel spool shafts 14a and 15a which protrude from the inner frame 12. A driven spool 14 and a drive spool (take-up spool) 15 are rotatably fitted on and supported by the spool shaft 14a and the spool shaft 15a, respectively. The spool shaft 14a and the spool shaft 15a can be detached from the driven spool 14 and the drive spool 15, respectively. The film back 10 is provided in front of the driven spool 14 with a guide roller 16. The film back 10 is provided in front of the drive spool 15 with two guide rollers 17 and 18. All the guide rollers 16, 17 and 18 and the spool shafts 14a and 15a extend parallel to one another. The film back 10 is provided between the guide rollers 16 and 17 with a pressure plate 20. When the film back 10 is attached to the back of the camera body 50, part of the loaded roll-film which is positioned immediately in front of the pressure plate 20 lies in a focal plane (not shown) located in the camera body 50. As known in the art, the pressure plate is a support member which presses against the film (i.e., a film frame which is to be exposed at a time of exposure) from behind a sensitive surface thereof so as to keep the film flat.

As shown in FIG. 1, the film F is fed from the driven spool 14, wound around the guide roller 16, and then crosses over the front of the pressure plate 20. Subsequently, the film F is wound around the two guide rollers 17 and 18, and then wound on the drive spool 15. The drive spool 15 can be associated with a reversible motor 40 to rotate about the spool shaft 15a counterclockwise as viewed in FIG. 1. Rotation of the drive spool 15 counterclockwise as viewed in FIG. 1 causes the film F to move in a film winding direction; namely, the film F is fed from the driven spool 14, and then wound on the drive spool 15 after crossing over the front of the pressure plate 20. Accordingly, the film back 10 incorporates a film feed mechanism with which the film F can be made to cross over the front of the pressure plate 20 to be then wound on the drive spool 15 in accordance with an operation of the reversible motor 40. The camera body 50 is provided with a rectangular aperture 60 which determines the picture format area that forms the limits of each frame exposed, and is further provided immediately behind the aperture 60 with film guide rails (not shown). The film F passes through a narrow space between the guide rails and the pressure plate 20.

The film back 10 is provided behind the pressure plate 20 with a film suction mechanism (vacuum mechanism) which brings the film F in the picture format area into intimate contact with the pressure plate 20 so as to keep the film F in the picture format area flat thereat. The pressure plate 20 is provided with a plurality of intake holes (through-holes) 22 which extend through the pressure plate 20 in a direction orthogonal to the pressure plate 20. Although only three of the plurality of intake holes 22 appear in a cross sectional view of the film back 10 shown in FIG. 1, a large number of intake holes 22 are formed on the pressure plate 20. The film back 10 is provided immediately behind the pressure plate 20 with a back plate 23 that is fixed to the rear of the pressure plate 20. A support plate 26 is fixed to the back of the back plate 23, while a through hole 25 which extends through both the pressure plate 20 and the support plate 26 horizontally as viewed in FIG. 1 is provided. An air inflow space 24 is formed between the back plate 23 and the pressure plate 20. Air can enter and exit the air inflow space 24 only through the intake holes 22 and the through hole 25. A rubber member 27 is fixed to the back of the support plate 26 to form a pressure adjustment chamber 28 therebetween. The pressure adjustment chamber 28 is connected to the air inflow space 24 via the through hole 25. The rubber member 27 is provided at the boundary position between the through hole 25 and the air adjustment chamber 28 with an intake valve 29 as part of the rubber member 27. The intake valve 29 is a one-way valve which can open only toward the pressure adjustment chamber 28 side, i.e., to the left as viewed in FIG. 1.

The film back 10 is provided adjacent to the pressure adjustment chamber 28 with a suction pump 30. The suction pump 30 can be associated with the reversible motor 40 to rotate a rotor 32 about an eccentric shaft 31, to which the rotor 32 is eccentrically fixed, which causes the rotor 32 to push (deform) the rubber member 27 for each rotation of the rotor 32 to thereby change the volume of the pressure adjustment chamber 28. When the volume of the pressure adjustment chamber 28 decreases due to the rotor 32 of the suction pump 30 pushing the rubber member 27 inwards, the pressure in the pressure adjustment chamber 28 increases. This causes a discharge valve 33, which is formed integral with the rubber member 27, to open to thereby discharge the air in the pressure adjustment chamber 28 to a front cock 34 fixed to the support plate 26. The front cock 34 is connected with the pressure adjustment chamber 28. The discharge valve 33 is a one-way valve which can open only toward the front cock 34, i.e., to the left as viewed in FIG. 1.

Subsequently, when the volume of the pressure adjustment chamber 28 increases upon the rotor 32 further rotating so that the rubber member 27 flexes back to the original shape thereof, the pressure in the pressure adjustment chamber 28 decreases. This causes the intake valve 29 to open to thereby cause the air in the air inflow space 24 flow into the pressure adjustment chamber 28. This induces the sucking of air into the air inflow space 24 from the front of the pressure plate 20 via the intake holes 22 formed thereon.

The front cock 34 is connected to a rear cock 36 via a connecting tube 35 whose opposite ends are respectively fitted on the cocks 34 and 36. The rear cock 36 is fixed to the inner frame 12 in the vicinity of the rear end thereof. The air sent from the front cock 34 via the connecting tube 35 flows out of the back lid 13 via the rear cock 36. A rubber ring 37 is tightly held between the inner frame 12 and the back lid 13 so that the air that comes out of the rear cock 36 does not leak into the film back 10. The air that comes out of the rear cock 36 is discharged to the outside of the film back 10 via a through hole 38 which is formed on the back lid 13.

The suction pump 30, the rubber member 27, the intake valve 29, the discharge valve 33, the front and rear cocks 34 and 36, the connecting tube 35, the support plate 26, the through hole 25, the back plate 23, the pressure plate 20 and the intake holes 22 constitute the film suction mechanism. Accordingly, in the film suction mechanism having such structure, when the pressure in the pressure adjustment chamber 28 increases due to an operation of the suction pump 30 which pushes the rubber member 27 to thereby decrease the volume of the pressure adjustment chamber 28, the discharge valve 33 opens to discharge the air in the pressure adjustment chamber 28 to the outside of the film back 10 via the front cock 34, the connecting tube 35, the rear cock 35 and the through hole 38. Thereafter, when the pressure in the pressure adjustment chamber 28 decreases when the rubber member 27 flexes back to the original shape thereof due to further rotation of the rotor 32 so that the volume of the pressure adjustment chamber 28 increases, the intake valve 29 opens to make the air in the air inflow space 24 into the pressure adjustment chamber 28, which induces the sucking of air into the air inflow space 24 from the front of the pressure plate 20 via the intake holes 22. Accordingly, such a series of operations performed by the film suction mechanism can bring the film F in the picture format area into intimate contact with the pressure plate 20 so as to keep a sensitive surface of the film F in the picture format area flat thereat if the film F has been loaded in the film back 10.

The reversible motor 40, which can be associated with the drive spool 15, is positioned in the camera body 50. The reversible motor 40 is provided on a rotary shaft thereof with a drive pinion 41. Forward rotation (clockwise rotation as viewed in FIG. 1) of the drive pinion 41 of the reversible motor 40 causes the drive spool 15 to rotate in a film winding direction (counterclockwise as viewed in FIG. 1), while reverse rotation (counterclockwise rotation as viewed in FIG. 1) of the drive pinion 41 of the reversible motor 40 causes the aforementioned film suction mechanism to operate. In a state where the film back 10 is coupled to the camera body 50, the drive pinion 41 is engaged with a gear 42 provided in the film back 10. The film back 10 is provided therein with a planetary gear mechanism (associating mechanism) which includes a sun gear 44, a planet gear 45 and a swing arm 46. Rotation of the drive pinion 41 is transmitted to the sun gear 44 via the gears 42 and 43. The sun gear 44 remains in mesh with the planet gear 45. The rotational shaft of the planet gear 45 is supported by a free end of the swing arm 46. The other end of the swing arm 46 is pivoted about the rotational shaft of the sun gear 44. Therefore, in a state where the planet gear 45 is allowed to move (revolve) around the sun gear 44, rotation of the sun gear 44 causes the planet gear 45 to move (revolve) around the sun gear 44 in the same rotational direction. Conversely, in a state where the planet gear 45 is prohibited from moving (revolving) around the sun gear 44, the planet gear 45 rotates about the rotational shaft thereof in the rotational direction opposite to the rotational direction of the sun gear 44.

The planet gear 45 is engaged with either a spool gear 47 formed on the drive gear 15 or a pump idle gear 48. The planet gear 45 is brought into engagement with the spool gear 47 when the drive pinion 41 of the reversible motor 40 rotates forwardly (clockwise as viewed in FIG. 1), so that the drive spool 15 rotates in the film winding direction (counterclockwise as viewed in FIG. 1) when associated with the reversible motor 40. The film F is wound on the drive spool 15 when the drive spool 15 rotates in the film winding direction. On the other hand, when the drive pinion 41 of the reversible motor 40 rotates reversely (counterclockwise as viewed in FIG. 1), the planet gear 45 is brought into engagement with the pump idle gear 48, so that a pump gear 49 that is engaged with the pump idle gear 48 rotates counterclockwise as viewed in FIG. 1. The eccentric shaft 31, about which the rotor 32 rotates eccentrically, serves as the rotational shaft of the pump gear 49. Accordingly, counterclockwise rotation of the pump gear 49 causes the rotor 32 to rotate to thereby perform the aforementioned operation of the suction pump 30 when the pump gear 49 is associated with the reversible motor 40 via the planet gear 45.

With such structures, forward rotation of the drive pinion 41 of the reversible motor 40 causes the drive spool 15 to rotate in the film winding direction, while reverse rotation of the drive pinion 41 of the reversible motor 40 causes the aforementioned film suction mechanism to operate so as to bring the film F on the pressure plate 20 into intimate contact with the pressure plate 20 by vacuum aspiration. Accordingly, it can be understood that the film feed operation, in which the film is wound on the drive spool 15, and the film suction operation, in which the film F on the pressure plate 20 is brought into intimate contact with the pressure plate 20 by vacuum aspiration, are performed using a single motor, i.e., the reversible motor 40. Therefore, it is unnecessary to provide two independent drive sources (motors) for the film feed mechanism and the film suction mechanism, which is advantageous in the efficiency of space in the camera and also the cost of production. Furthermore, since the film suction operation continues as long as the reversible motor 40 is driven to rotate reversely, the camera body 50 with the film back 10 can be advantageously used for bulb exposure.

FIG. 2 is a schematic block diagram of the film back 10 and the camera body 50 to which the film back 50 is attached, showing fundamental components of the film back 10 and the camera body 50. The camera body 50 is provided therein with a quick-return mirror 61 which is rotatable between a lower position (initial position) and an upper position (retreated position). The camera body 50 is provided with a focal plane shutter 51 (see FIG. 1) having a leading curtain 52 and a trailing curtain 53, while the quick-return mirror 61 is disposed in front of the focal plane shutter 51. The quick-return mirror 61 is positioned in the photographic optical path to reflect the incident light which is passed through the photographing optical system toward the viewfinder optical system of the camera body 50 when the quick-return mirror 61 is in the lower position, and upon a photographic operation, the quick-return mirror 61 retreats from the photographic optical path between the photographing optical system and the focal plane shutter 51 to allow the light that is passed through the photographing optical system to proceed toward the focal plane shutter 51. The leading and trailing curtains 52 and 53 are driven with the quick-return mirror 61 being retreated so that the trailing curtain 53 starts moving at the moment a predetermined period of time elapses after the leading curtain 52 starts moving to thereby make a film frame of the film F on the pressure plate exposed. Accordingly, the exposure time on the film F can be controlled by controlling the commencement of driving of each of the leading and trailing curtains 52 and 53.

The camera body 50 is provided with a control circuit 54 which controls a release magnet 56, a leading curtain magnet 57 and a trailing curtain magnet 58 in a predetermined manner, which will be discussed later, in accordance with the release signal output from the release switch 55 to perform the mirror-up operation and the shutter drive operation. The control circuit 54 also controls the reversible motor 40.

The photographing operation of the camera system shown in FIG. 2 will be hereinafter discussed with reference to FIG. 3. FIG. 3 is a time chart showing an example of a sequence of fundamental operations in an exposure process for one film frame in the camera system. The horizontal axis of the time chart represents the lapse of time. With the film back 10 attached to the camera body 50, the exposure operation starts upon the release switch 55 being turned ON. At the moment an exposure sequence starts to be performed, the mirror 61 is still held at the lower position thereof by the release magnet 56 while being charged so as to move to the retreated position. The release magnet 56 is an electromagnet which holds the mirror 61 in the lower position thereof when no power is supplied to the release magnet 56, and releases the mirror 61 so that the mirror 61 moves to the retreated position when power is supplied to the release magnet 56. Furthermore, at the moment an exposure sequence starts to be performed, each of the leading and trailing curtains 52 and 53 is still held in the closed position (initial position) thereof by a corresponding mechanical hold device (not shown) though each of them has been charged and thus ready to move. Immediately after the release signal output from the release switch 55 is input to the control circuit 54, the leading curtain magnet 57 and the trailing curtain magnet 58 are turned ON to electromagnetically hold the leading curtain 52 and the trailing curtain 53, respectively. At this moment, the mechanical hold of each of the leading curtain 52 and the trailing curtain 53 is released. Subsequently, the release magnet 56 is turned ON to release the quick-return mirror 61 to swing the same up to the retreated position thereof. Immediately after it is detected that the quick-return mirror 61 has been fully retreated, the power supplied to the leading curtain magnet 57 is cut off so that the leading curtain 52 starts moving. After a predetermined period of time elapses since the power supplied to the leading curtain magnet 57 is cut off, the power supplied to the trailing curtain magnet 58 is cut off so that the trailing curtain 53 starts moving. Film frame of the film F on the pressure plate 20 is exposed for an exposure time determined according to the commencement of driving of each of the leading and trailing curtains 52 and 53, as mentioned above.

At the same time the power supplied to the leading curtain magnet 57 is cut off to start the film exposure operation, the control circuit 54 actuates the reversible motor 40 to rotate reversely to start the film suction operation, in which the film F on the pressure plate 20 is brought into intimate contact with the pressure plate 20 by vacuum aspiration. This film suction operation in which the reversible motor 40 is driven reversely continues to be performed until the completion of movement of the trailing curtain 53. Therefore, the film frame of the film F on the pressure plate 20 (i.e., in the picture format area) is reliably kept flat during the film exposure operation. The reverse rotation of the reversible motor 40 is controlled to stop, e.g., when a period of time which is determined in anticipation of the duration of movement of the trailing curtain 53 elapses after the power supplied to the trailing curtain magnet 58 is cut off. Accordingly, the duration of the film suction operation can be controlled to correspond to the film exposure time by controlling the commencement of driving of the reversible motor 40 and the completion of driving of the same in accordance with the stop of power supply to each of the leading curtain magnet 57 and the trailing curtain magnet 58 even if the film exposure time varies.

The control circuit 54 controls the reversible motor 40 to rotate forwardly after the reversible motor 40 stops rotating reversely. This causes the planet gear 45 to be engaged with the spool gear 47, so that the drive spool 15 rotates in the film winding direction to wind the film F on the drive spool 15. The forward rotation of the reversible motor 40 is controlled to stop upon the completion of winding of the currently exposed frame of the film F. At the same time this film winding operation is performed, the quick-return mirror 61 is returned to the lower position (initial position) thereof while being charged for the subsequent exposure. This mirror charging operation can be performed using the drive force of the reversible motor 40. For instance, a gear mechanism (not shown) used for charging the quick-return mirror 61 can be provided between the motor pinion 41 and the quick-return mirror 61. More specifically, the gear mechanism can be provided with, e.g., at least one gear which is provided independent of the gear 42 and which is engaged with the motor pinion 41 so that the forward rotation of the reversible motor 40 is transmitted to the quick-return mirror 61 via the aforementioned at least one gear. In this case, the gear mechanism is provided with a one-way clutch which transmits rotation in one rotational direction (i.e., a mirror charging direction), corresponding to the forward rotational direction of the reversible motor 40, to the quick-return mirror 61, but does not transmit rotation in the other rotational direction to the quick-return mirror 61. With this one-way clutch, no unnecessary rotation is transmitted to the quick-return mirror 61 when the reversible motor 40 rotates reversely for the film suction operation, and the quick-return mirror 61 can be made to rise without being interfered by the gear mechanism.

As can be understood from the foregoing, according to a film support and feed system to which the present invention is applied, since the film winding operation and the film suction operation are performed by the forward rotation and reverse rotation of the reversible motor 40, respectively, it is unnecessary to provide the camera with an independent drive source for bringing film on pressure plate into intimate contact with the pressure plate by vacuum aspiration. Furthermore, the duration of the film suction operation can be controlled freely by controlling the duration of the reverse rotation of the reversible motor 40.

The present invention is not limited solely to the above-illustrated embodiment. For instance, although the film winding operation and the film suction operation are performed by the forward rotation and reverse rotation of the reversible motor 40, respectively, in the above-illustrated embodiment, in theory, the film rewinding operation and the film suction operation can be performed by the forward rotation and reverse rotation of the reversible motor 40, respectively. Accordingly, the present invention can be applied to a camera using 35 mm film cassette so that the film winding operation is performed by operating a wind-on lever or crank arm provided on a camera body while the film rewinding operation is performed by a motor.

Although the reverse rotation of the reversible motor 40 is controlled in accordance with the operation of the focal plane shutter 51 in the above-illustrated embodiment, the present invention can be applied to not only an SLR camera but also a lens shutter type camera. In this case, the film suction operation that is suitable for bulb exposure can be performed if the reversible motor is controlled in accordance with the opening/closing of the lens shutter in a manner similar to that in the above-illustrated embodiment.

Although the film suction mechanism is of a type in which a rotor (32) is driven to rotate about an eccentric shaft (31) in the above-illustrated embodiment, the film suction mechanism can be of any other type as long as the film suction operation is performed when the film suction mechanism is associated with the reversible motor.

Although the reversible motor is positioned in the camera body in the above-illustrated embodiment, the reversible motor can be positioned in the film back.

Although the present invention in applied to a camera system having a film back in the above-illustrated embodiment, the present invention can be applied to any other type of cameras which do not use a film back.

As can be understood from the foregoing, according to a film support and feed system of a camera to which the present invention is applied, a film support and feed system of a camera which does not require an independent drive source for bringing film on pressure plate into intimate contact with the pressure plate by vacuum aspiration and which makes long-duration film suction possible with high space efficiency and at a low cost of production can be obtained.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A film support and feed system of a camera, comprising:
   a pressure plate positioned immediately behind a frame of roll-film which is to be exposed at a shutter release;
   a film feed mechanism which moves said film frame in a space in front of said pressure plate;
   a film suction mechanism which brings said film frame into intimate contact with said pressure plate by vacuum aspiration;
   a reversible motor; and
   an associating mechanism which selectively associates said reversible motor with one of said film feed mechanism and said film suction mechanism in accordance with a direction of rotation of said reversible motor,
   wherein said reversible motor is associated with said film feed mechanism by said associating mechanism to operate said film feed mechanism when said reversible motor is driven to rotate in a forward direction, and
   wherein said reversible motor is associated with said film suction mechanism by said association mechanism to operate said film suction mechanism when said reversible motor is driven to rotate in a reverse direction.

2. The film support and feed system according to claim 1, further comprising a controller which controls said reversible motor to continue rotating in said reverse direction to thereby keep said film frame into intimate contact with said pressure plate by vacuum aspiration by said film suction mechanism during an exposure of said film frame.

3. The film support and feed system according to claim 1, wherein said associating mechanism comprises a planet gear which is engaged with a gear of one of said film feed mechanism and said film suction mechanism when said reversible motor is driven to rotate in a corresponding one of said forward direction and said reverse direction, respectively.

4. The film support and feed system according to claim 1, wherein said camera comprises a camera body and a film back which is detachably attached to said camera body, wherein at least said pressure plate, said film feed mechanism and said film suction mechanism are incorporated in said film back.

5. The film support and feed system according to claim 1, wherein a film winding operation in which said roll-film is wound on a take-up spool of said camera is performed when said reversible motor is driven to rotate in said forward direction.

6. The film support and feed system according to claim 1, wherein said film suction mechanism comprises:
   a plurality of through holes formed on pressure plate; and
   a suction pump having a rotor, wherein said suction pump is associated with said reversible motor to rotate said rotor when said reversible motor is driven to rotate in said reverse direction.

7. The film support and feed system according to claim 4, wherein said space, in which said film frame is moved by said film feed mechanism, is positioned behind an aperture formed on said camera body which forms the limits of each film frame exposed of said roll-film.

8. The film support and feed system according to claim 1, wherein said associating mechanism comprises a planetary gear which includes of a sun gear and a planet gear which is engaged with and rotates around said sun gear.

9. A camera system having a camera body and a film back which is detachably attached to said camera body, said camera body comprising a reversible motor, wherein roll-film is accommodated in said film back, said film back comprising:
   a pressure plate positioned immediately behind a film frame of said roll-film which is to be exposed at a shutter release;
   a film feed mechanism which feeds said film frame;
   a film suction mechanism which brings said film frame into intimate contact with said pressure plate by vacuum aspiration; and
   an associating mechanism which selectively associates said reversible motor with one of said film feed mechanism and said film suction mechanism in accordance with a direction of rotation of said reversible motor, wherein said reversible motor is associated with said film feed mechanism by said associating mechanism to operate said film feed mechanism when said reversible motor is driven to rotate in a forward direction, and wherein said reversible motor is associated with said film suction mechanism by said association mechanism to operate said film suction mechanism when said reversible motor is driven to rotate in a reverse direction.

10. A film support and feed system of a camera, comprising:

a film feed mechanism which moves a roll-film in space in front of a pressure plate;

a film suction mechanism which brings said film into intimate contact with said pressure plate by vacuum aspiration;

a reversible motor; and an associating mechanism which selectively transmits a driving force of said reversible motor to one of said film feed mechanism and said film suction mechanism in accordance with a corresponding one of a forward rotation and a reverse rotation of said reversible motor.

* * * * *